(12) United States Patent
Hodgkins et al.

(10) Patent No.: US 11,905,176 B2
(45) Date of Patent: Feb. 20, 2024

(54) METHOD FOR MANUFACTURE OF LOW SILICA MFI FRAMEWORK ZEOLITE IN THE PRESENCE OF ODSO

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 102 days.

(21) Appl. No.: 17/720,123

(22) Filed: Apr. 13, 2022

(65) Prior Publication Data

US 2023/0331567 A1 Oct. 19, 2023

(51) Int. Cl.
| | |
|---|---|
| *C01B 39/40* | (2006.01) |
| *B01J 29/40* | (2006.01) |
| *B01J 37/03* | (2006.01) |
| *B01J 37/08* | (2006.01) |

(52) U.S. Cl.
CPC ............. *C01B 39/40* (2013.01); *B01J 29/40* (2013.01); *B01J 37/031* (2013.01); *B01J 37/08* (2013.01); *C01P 2006/80* (2013.01)

(58) Field of Classification Search
CPC ......... C01B 39/40; B01J 29/40; B01J 37/031; B01J 37/08; C01P 2006/80
See application file for complete search history.

(56) References Cited

U.S. PATENT DOCUMENTS

| | | | |
|---|---|---|---|
| 3,313,594 A | 4/1967 | Wilson | |
| 3,516,786 A | 6/1970 | Maher et al. | |
| 3,556,725 A | 1/1971 | Chiola et al. | |
| 3,702,886 A | 11/1972 | Argauer | |
| 5,763,720 A | 6/1998 | Buchanan et al. | |
| 5,951,962 A | 9/1999 | Müller et al. | |
| 6,337,063 B1 | 1/2002 | Rouleau et al. | |
| 7,923,522 B2 | 4/2011 | Hamada et al. | |
| 9,517,453 B2 * | 12/2016 | Martinez | B01J 35/10 |
| 10,167,201 B2 * | 1/2019 | Moscoso | B01J 29/70 |
| 10,781,168 B2 | 9/2020 | Koseoglu et al. | |
| 10,793,782 B2 | 10/2020 | Koseoglu et al. | |
| 10,807,947 B2 | 10/2020 | Koseoglu et al. | |
| 10,927,318 B2 | 2/2021 | Koseoglu et al. | |

(Continued)

FOREIGN PATENT DOCUMENTS

| | | | |
|---|---|---|---|
| CN | 102452663 A | 5/2012 | |
| CN | 103055933 A | 4/2013 | |

(Continued)

OTHER PUBLICATIONS

Choi et al. Nature 2006, 5, 718-723 (Year: 2006).*

(Continued)

*Primary Examiner* — Anthony J Zimmer
*Assistant Examiner* — Jordan W Taylor
(74) *Attorney, Agent, or Firm* — Leason Ellis LLP

(57) ABSTRACT

The present disclosure is directed to a method of manufacture of low silica zeolite having MFI framework, such as ZSM-5. A sol-gel formulation includes a water-soluble fraction of ODSO as an additional component. The resulting products include low silica zeolite having MFI framework, whereas in the absence of the ODSO, the resulting products are zeolite impurities including analcime.

20 Claims, 5 Drawing Sheets

(56) References Cited

U.S. PATENT DOCUMENTS 11,007,511 B2 * 5/2021 Kobaslija ................ C01B 39/48
11,111,212 B2 9/2021 Koseoglu et al.

FOREIGN PATENT DOCUMENTS

| CN | 106145134 A | 11/2016 |
|---|---|---|
| CN | 107982540 A | 5/2018 |
| EP | 0999183 B1 | 6/2003 |
| WO | 2018202468 A1 | 11/2018 |

OTHER PUBLICATIONS

Grabicka et al. "Microwave-assisted synthesis of periodic mesoporous organosilicas with ethane and disulfide groups." Microporous and mesoporous materials 119.1-3 (2009): 144-149.

Jin et al. "Gold nanoparticles stabilized in a novel periodic mesoporous organosilica of SBA-15 for styrene epoxidation." Microporous and mesoporous materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

* cited by examiner

METHOD FOR MANUFACTURE OF LOW SILICA MFI FRAMEWORK ZEOLITE IN THE PRESENCE OF ODSO

FIELD OF THE DISCLOSURE

The present disclosure relates to methods of making zeolites.

BACKGROUND OF THE DISCLOSURE

Zeolites

Zeolites are crystalline solids possessing well-defined structures and uniform pore sizes that can be measured in angstroms (Å). Typically, zeolites comprise framework atoms such as silicon, aluminum and oxygen arranged as silica and alumina tetrahedra. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components.

ZSM-5 zeolites are a type of zeolite having a MFI framework (where MFI is the three letter code established by the International Zeolite Association), an orthorhombic structure and belonging to the pentasil family. The general formula is $Na_nAl_nSi_{96-n}O_{192} \cdot 16H_2O$ (0<n<27)). ZSM-5 zeolites have pore dimensions that results in the formation of channels of suitable size and shape for selective passage for xylene isomers. For example, in a mixture of p-, o- and m-xylenes, p-xylene readily passes through the channels of ZSM-5 catalysts due to its linear configuration, while diffusion of o-xylene and m-xylene is hindered.

Methods for preparing ZMS-5 are known, typically by sol-gel synthesis. For example, U.S. Pat. No. 3,702,886, the entire contents of which are incorporated herein by reference, discloses a process for preparing ZSM-5 using a mixture of alkali metal cations and tetraalkylammonium cations, such as tetrapropylammonium (TPA) cations as a template or structure directing agent to direct the synthesis of the ZSM-5 structure. Numerous variations of this method are known, and it is appreciated that the physical and catalytic properties of the ZSM-5 can be highly dependent upon the method by which it is manufactured.

ZSM-5 zeolites have the characteristics listed in Table 1. ZSM-5 comprises the MFI framework having a micropore size related to the 10-member rings when viewed along the [100] and [010] directions of 5.1×5.5 Å and 5.3×5.6 Å, respectively. A person skilled in the art will recognize that unit cell parameters can vary slightly depending on framework composition such as the $SiO_2/Al_2O_3$ molar ratio (SAR).

Under typical sol-gel synthesis processes for forming zeolites having an MFI framework, a sufficient silica level is required to realize that framework. For example, consider two conventional syntheses carried out under the same conditions, with the only variation being the SAR level in the sol-gel, and using water as the solvent as is conventionally known. In instances, using a SAR level of about 100 yields ZSM-5 zeolite; however, reducing the SAR to about 25 yields analcime (which is an ANA type framework zeolite, where ANA is the three letter code established by the International Zeolite Association). In the context of synthesis of MFI framework zeolite such as ZSM-5, ANA framework zeolite is considered to be an impurity or by-product.

Varying the SAR level of MFI framework zeolite does not affect the overall framework structure. However, acid strength and acid site density are influenced. These characteristics play a significant role in catalysis by influencing catalyst activity and product distribution. Additionally, the SAR level impacts on the physicochemical properties of zeolite, since zeolites possessing a high SAR levels have lower acidity levels and are hydrophobic, in contrast to zeolites with a low SAR level which have higher acidity levels and are hydrophilic.

For example, in the conversion of ethanol to various hydrocarbon compounds over ZSM-5 zeolites the product distribution was dependent on the SAR (Ramasamy, Karthik and Yong Wang. "Ethanol conversion to hydrocarbons on HZSM-5: Effect of reaction conditions and Si/Al ratio on the product distributions." *Catalysis Today* 237 (2014): 89-99). The low acid density catalysts (e.g., higher SAR) tended to deactivate faster and generate more unsaturated hydrocarbon compounds at a similar time-on-stream, whereas low SAR Na-ZSM-5 zeolites (SAR=20) for butene cracking reactions demonstrated promise in having a high propylene yield, catalytic activity, and stability (Auepattana-aumrung, Chanon, Victor Marquez, Sippakorn Wannakao, Bunjerd Jongsomjit, Joongjai Panpranot and Piyasan Praserthdam. "Role of Al in Na-ZSM-5 zeolite structure on catalyst stability in butene cracking reaction." *Scientific Reports* 10 (2020): 13643-13643).

ODSO

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream co-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce ZSM-5 zeolites, there remains a need in the art for improved methods to produce zeolite materials, in particular using DSO by-products in an economically and environmentally friendly manner. It is in regard to these and other problems in the art that the present disclosure is directed to provide a technical solution for an effective method of manufacturing MFI framework zeolite.

SUMMARY OF THE DISCLOSURE

A method for the preparation of zeolite having a MFI framework and a $SiO_2/Al_2O_3$ molar ratio (SAR) in the range of less than about 40 is provided. The method comprises: forming a homogeneous aqueous mixture of a silica source, an aluminum source, an alkali metal source, an optional structure directing agent, and an effective amount of water-soluble oxidized disulfide oil (ODSO); and heating the homogeneous aqueous mixture under conditions and for a time effective to form a crystalline zeolite as precipitate suspended in a supernatant, wherein the precipitate comprises MFI framework zeolite with a SAR of less than about 40. In certain embodiments, the precipitate is recovered and calcined at a suitable temperature, temperature ramp rate and for a suitable period of time to realize porous MFI framework zeolite.

In certain embodiments, a cumulative amount of ODSO and water is equivalent to an amount of water that is effective to produce analcime (ANA) zeolite in the absence of ODSO; the cumulative amount of ODSO and water, an amount of the silica source, an amount of the aluminum source, an amount of the alkali metal source, and an amount of the structure directing agent are provided at an ODSO-enhanced compositional ratio; the ODSO-enhanced compositional ratio is equivalent to a baseline compositional ratio of water, silica source, aluminum source, alkali metal source and structure directing agent, the baseline compositional ratio being effective to produce analcime zeolite in the absence of ODSO; and the conditions and time of heating are equivalent to those that are effective to produce analcime zeolite in the absence of ODSO. In certain embodiments, the effective amount of ODSO is greater than an amount of ODSO that produces only analcime zeolite, and less than an amount of ODSO that produces only amorphous silica. In certain embodiments, the alkali metal source is sodium and the mass ratio of ODSO to sodium is in the range of about 1.7-8.7.

In certain embodiments, the ODSO is derived from oxidation of disulfide oil compounds present in an effluent refinery hydrocarbon stream recovered following catalytic oxidation of mercaptans present in a mercaptan-containing hydrocarbon stream. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' the same or different C1-C10 alkyl or C6-C10 aryl. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR), and (R'—SOO—SOO—OR), wherein R and R' are the same or different C1-C10 alkyl or C6-C10 aryl. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are the same or different C1-C10 alkyl or C6-C10 aryl. In certain embodiments, the silica-to-alumina ratio (SAR) in the zeolite product is between about 10 and 25.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
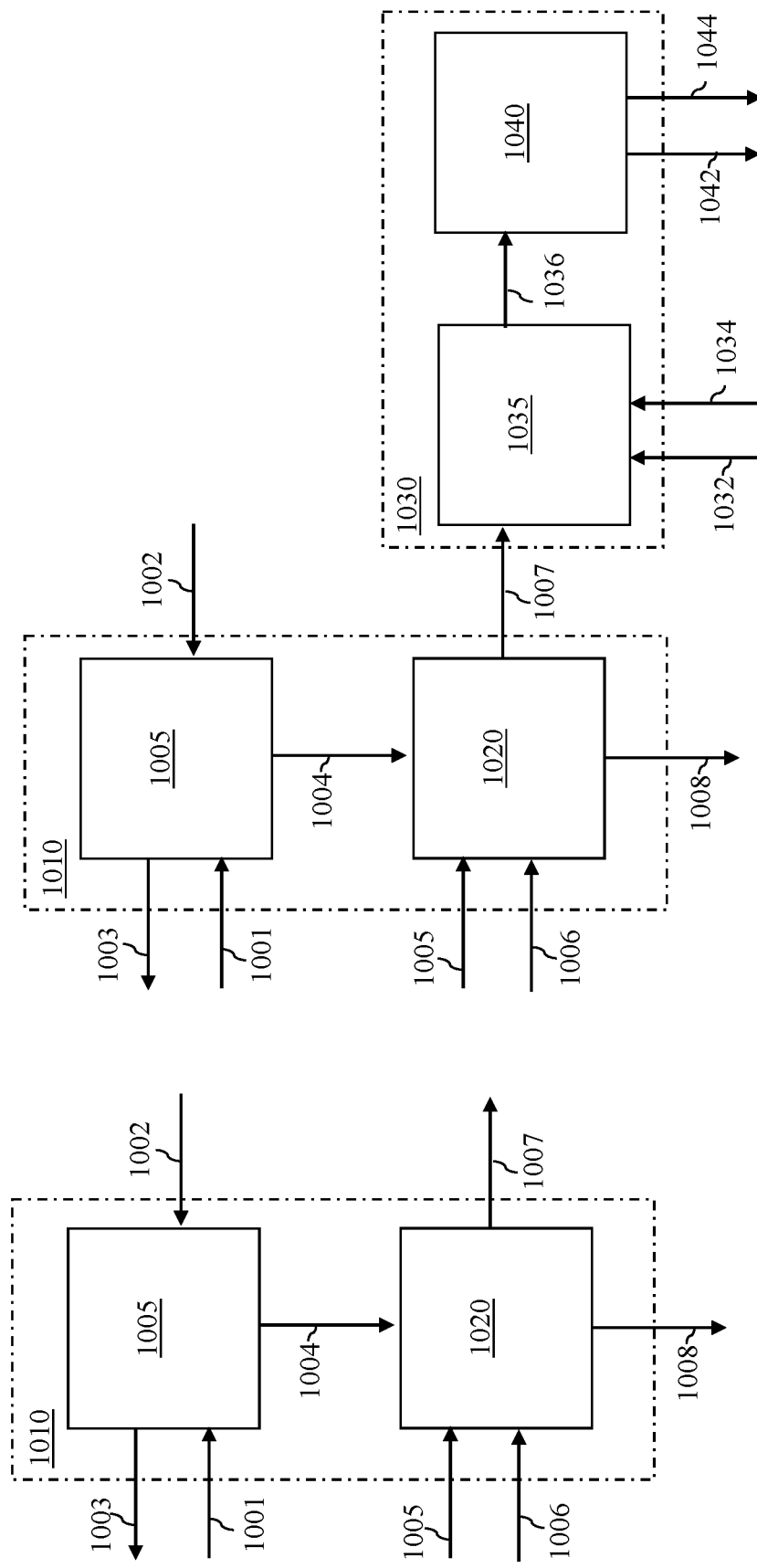
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

The present disclosure is directed to a method of manufacture of low silica zeolite having MFI framework, such as ZSM-5. As used herein, "low silica" in the context of the zeolite having MFI framework refers to SAR levels in the synthesized zeolite of less than about 40 or 25, in certain embodiments about 10-40, 15-40, 10-30, 15-30, 10-25 or 15-25. This is accomplished by using an improved sol-gel formulation including a water-soluble fraction of ODSO as an additional component. The resulting products are, or contain, ZSM-5, whereas in the absence of the ODSO, the resulting products are zeolite impurities including analcime.

A method for the preparation of a zeolite having MFI framework is provided that advantageously utilizes as ODSO a component, for example derived from a waste refinery stream of disulfide oil. The MFI framework zeolite is obtained using a homogeneous aqueous mixture of an aluminum source, a silica source, water-soluble ODSO, an alkali metal source and an optional structure directing agent. In particular, a low silica zeolite is formed. The aqueous mixture is heated under conditions and for a time effective to form the MFI framework zeolite.

Commonly owned U.S. application Ser. No. 17/493,206 filed Oct. 4, 2021, entitled "Method for Manufacture of a Modified ZSM-5 Zeolite in the Presence of ODSO," is incorporated by reference herein in its entirety (the '206 application). The '206 application discloses using ODSO in the process of making a modified ZSM-5 zeolite. In the embodiments described in the '206 application, the quantities of silica in the sol-gel are such that MFI framework zeolite, ZSM-5, is produced whether or not ODSO is used. For instance, in the examples of the '206 application, the SAR of the sol-gel was about 100. However, the inventors have discovered that MFI framework zeolite can be produced at lower SAR levels in the sol-gel, resulting in lower final product SAR, by inclusion of ODSO as an additional component.

In conventional zeolite synthesis, water is used as an aqueous medium and as a solvent. In the embodiments of the present disclosure, an effective amount of water-soluble ODSO compounds is added as an additional component within the homogeneous aqueous mixture. In certain embodiments, the ODSO is derived from a sulfur-containing refinery waste stream and is used as a component for the synthesis of zeolites whereby pentasil zeolite having a MFI framework is formed. The inclusion of an ODSO component to the homogeneous aqueous mixture results in crystallization of the pentasil zeolite having a MFI framework, using lower than conventional SAR levels in the sol-gel. In certain embodiments the homogeneous aqueous mixture is one that produces analcime in the absence of ODSO.

In the zeolites formed herein, the content of MFI zeolite is in the range of about 0.1-100, 1-100, 5-100, 10-100, 25-100, 50-100, 75-100 or 90-100 mass %. The remainder (if the product is not 100% MFI zeolite) can be one or more of analcime (ANA) zeolite, MOR zeolite, amorphous silica-alumina, amorphous silica, or other unidentified crystalline materials. In certain embodiments the synthesized MFI zeolite has a cell data consistent with that of Table 1 for ZSM-5 zeolite, although variations can exist due to the influence of ODSO.

Synthesis Steps

Methods for the preparation of low silica MFI framework zeolites are provided. Effective amounts and proportions of precursors and reagents are formed as a homogeneous aqueous mixture, including a water source, an aluminum source, a silica source, an alkali metal source, and an optional structure directing agent. In the place of a certain amount of water, an effective amount of water-soluble ODSO is used as an additional component. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate (product) suspended in a supernatant (mother liquor). The precipitate is recovered, for example by filtration, washing and drying, as low silica zeolite having MFI framework. In certain embodiments the recovered product is calcined at a suitable temperature, temperature ramp rate and for a suitable period of time to realize low silica porous zeolite having MFI framework.

An effective amount of water for the aqueous environment and as a solvent during the sol-gel process can be provided from one or more water sources, including utility water that is added to form the homogeneous aqueous mixture, a water-containing silica source such as colloidal silica, an aqueous mixture of an aluminum oxide source, an aqueous mixture of an alkali metal source, and/or an aqueous mixture of an optional structure directing agent. The mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In certain embodiments, a homogeneous aqueous mixture is formed by: providing a silica source; combining an aluminum oxide source, an alkali metal source and an optional structure directing agent; and combining an effective amount of water-soluble ODSO. Alternatively, the water-soluble ODSO is combined with the aluminum oxide source, the alkali metal source and the structure directing agent, and that mixture is combined with the silica source.

In certain embodiments, a homogeneous aqueous mixture is formed by: providing an aluminum oxide source, an alkali metal source and an optional structure directing agent as a mixture; combining a silica source; and combining an effective amount of water-soluble ODSO. Alternatively, the water-soluble ODSO is combined with the silica source, and that mixture is combined with the aluminum oxide source, the alkali metal source and the structure directing agent.

In certain embodiments, a homogeneous aqueous mixture is formed by: providing an aluminum oxide source, an alkali metal source and an optional structure directing agent as a mixture; combining a silica source; and combining an effective amount of water-soluble ODSO. Alternatively, the water-soluble ODSO is combined with the silica source, and that mixture is combined with the aluminum oxide source, the alkali metal source and the structure directing agent.

In certain embodiments, a homogeneous aqueous mixture is formed by: forming an aqueous solution of an aluminum source, an alkali metal source and an optional structure directing agent; adding to the aqueous solution an effective amount of water-soluble ODSO; adding a silica source, since addition of the silica source forms a thick gel. In other embodiments, all or a portion of an effective amount of water-soluble ODSO can be added to the silica source, and that mixture is added to an aqueous solution of an aluminum source, an alkali metal source and an optional structure directing agent.

In certain embodiments, a homogeneous aqueous mixture is formed by: combining an effective amount of water-soluble ODSO with a silica source to form a mixture; and that mixture is combined with an aluminum oxide source, an alkali metal source and an optional structure directing agent.

In certain embodiments, a homogeneous aqueous mixture is formed by: combining an effective amount of water-soluble ODSO with an aluminum oxide source, an alkali metal source and an optional structure directing agent to form a mixture; and that mixture is combined with a silica source.

A homogeneous aqueous mixture of an aluminum source, a silica source, an alkali metal source, water-soluble ODSO and an optional structure directing agent, is formed from any of the above chronological sequences of component addition. The homogeneous aqueous mixture is heated under conditions and for a time effective to form a precipitate suspended in a supernatant, wherein the time and conditions are effective to realize the precipitate containing low silica zeolite having MFI framework, which is recovered, for example by filtration, washing and drying. The recovered precipitate is calcined at a suitable temperature, temperature ramp rate and for a suitable period of time to realize low silica porous zeolite having MFI framework.

It is to be appreciated by those skilled in the art that in certain embodiments effective baseline ratios for synthesis of zeolites including low SAR MFI zeolite as disclosed herein can be determined by empirical data, for instance summarized as phase boundary diagrams or other methodologies as is known in material synthesis. In an example disclose herein, the baseline ratios and conditions are effective, in the absence of ODSO, for synthesis of analcime. It is also to be realized that according to certain embodiments of the process herein, inclusion of an ODSO component results in shifting the material type out of the phase boundary diagram, even at approximately equivalent baseline ratios, from analcime to MFI zeolite.

In certain embodiments, effective ratios of precursors and reagents for production of zeolites herein are within those known to produce templated aluminosilicate zeolites and can be determined by those of ordinary skill in the art. For example, effective amounts of silica and alumina precursors are provided to produce synthesized zeolite having a silica-to-alumina ratio (SAR) in the range of about 10-1500, 10-1000, 10-500, 20-1500, 20-1000, 20-500, 25-1500, 25-1000, 25-500, 50-1500, 50-1000, 50-500, 100-1500, 100-1000 or 100-500. In certain embodiments, molar compositional ratios of the aqueous composition used produce templated aluminosilicate zeolites include:

$SiO_2/Al_2O_3$: 10-40 or 10-25
$OH^-/SiO_2$: 0.05-3
$R/SiO_2$: 0-1.5
Alkali metal cation/$SiO_2$: 0.075-1.5
$H_2O/SiO_2$: 5-120 wherein R is the structure directing agent, and a level of 0 represents absence of the structure directing agent.

It is appreciated by those skilled in the art that these molar composition ratios can be expressed on a mass basis. In certain embodiments, an exemplary compositional ratio is approximately 25 $SiO_2$:1 $Al_2O_3$:13.4 $Na_2O$:20 TPA:2000 $H_2O$ on a molar basis.

In the embodiments herein, ratios of components in homogeneous aqueous mixtures including ODSO are referred to as "ODSO-enhanced compositional ratios." In certain embodiments an ODSO-enhanced compositional ratio is one in which ODSO is included to replace an approximately equivalent mass of water in the homogeneous aqueous mixture, and wherein a cumulative mass of ODSO and water (ODSO+$H_2O$) is approximately equivalent to a mass of water that is effective to produce analcime zeolites in the absence of ODSO. In certain embodiments: a baseline compositional ratio of the silica, aluminum, alkali metal, structure directing agent and water is known or determined to be is effective to produce analcime zeolite in the absence of ODSO; an ODSO-enhanced compositional ratio is approximately equivalent to the baseline compositional ratio except for the substitution of ODSO for water on a mass basis; and wherein in certain embodiments the conditions and time of heating the ODSO-enhanced sol-gel is approximately equivalent to those that are effective to produce analcime zeolite in the absence of ODSO.

The aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides, aluminum alkoxides, aluminum wire and alumina gels. For example, suitable materials as aluminum sources include aluminum nitrate nonahydrate or other commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

The silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabot, and colloidal silica (LUDOX commercially available from Cabot).

Effective structure directing agents that can be used include known or developed structure directing agents for producing pentasil zeolite. In certain embodiments, effective structure directing agents include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol.

Effective structure directing agents that can be added include one or more of quaternary ammonium cation compounds (including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds. The cation can be paired with one or more of a hydroxide anion (for example, TPAOH or CTAOH), a bromide anion (for example, TPAB or CTAB), or an iodide anion. In certain embodiments the structure directing agents include bifunctional dicationic molecules containing a long aliphatic chain (for example $C_{22}H_{45}$—$N^+(CH_3)_2$—$C_6H_{12}$—$N^+(CH_3)_2$—$C_6H_{13}$, denoted $C_{22\text{-}6\text{-}6}$, $C_{22}H_{45}$—$N^+(CH_3)_2$—$C_6H_{12}$—$N^+(CH_3)_2$—$C_3H_7$, denoted $C_{22\text{-}6\text{-}3}$, or a poly(ethylene glycol)), dual-porogenic surfactants, silylated polyethylenimine polymers, amphiphilic organosilanes, or hydrophilic cationic polyelectroyltes/polymers such as poly(diallyldimethylammonium chloride) (PDADMAC).

The disclosed process for synthesizing low silica zeolite having MFI framework can occur in the absence or presence of seed materials. Suitable seed materials comprise zeolite structures such as ZSM-5 (MFI), ZSM-8 (MFI), ZSM-11 (MEL) and Silicalite-1 (MFI). Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate zeolite crystallization.

A hydroxide mineralizer is included as the hydroxide derived from the alkali metal source from the Periodic Table IUPAC Group 1 alkaline metals (and/or from the hydroxide of any hydroxide-containing structure directing agent). For example these are selected from the group consisting of NaOH, KOH, RbOH, LiGH, CsOH and combinations thereof. In certain embodiments a Na-based hydroxide mineralizer is selected. Note that the alkali metal source is provide as a hydroxide, but in embodiments herein where the ratio is expressed based on the mass of the alkali, it is the metal itself. For instance, when the alkali is NaOH, the ODSO/Na ratio is determined by dividing the mass of the ODSO by the mass of the Na portion of NaOH, that is, about 57.5% of the NaOH mass. In certain embodiments the basic components from the hydroxide mineralizer source are provided in effective amounts so as to maintain the homogeneous mixture at a pH level of greater than or equal to about 9, for example in the range of about 9-14, 9-13, 10-14, 10-13, 11-14 or 11-13. It is appreciated that the overall pH is influenced by anions from the hydroxide mineralizer source, and in certain embodiments anions from other sources such as from an optional structure directing agent, an alumina source or a silica source. In the process herein, the pH is reduced by the presence of ODSO, therefore, the quantity of the basic compound from one or more of the aforementioned sources can be adjusted accordingly to attain the requisite pH.

The mixing steps typically occur at ambient temperature and pressure (for instance about 20° C. and about 1 standard atmosphere), for a mixing time that sufficient to realize a homogeneous aqueous distribution of the components. In certain embodiments the homogeneous aqueous mixture can be aged before being subjected to subsequent hydrothermal treatment, for example for a period of about 0-24, 0-5, 0.5-24 or 0.5-5 hours. Hydrothermal treatment is then carried out at a temperature in the range of about 70-200, 70-190, 100-200, 150-200, 100-190 or 150-190° C. and at atmospheric or autogenous pressure (from the sol-gel or from the sol-gel plus an addition of a gas purge into the vessel prior to heating), and for a time period within the range of about 0.1-8, 0.2-8, 0.1-7, 0.2-7, 0,1-6, 0.2-6, 0.1-5 or 0.2-5 days, to ensure hydrolysis and formation of a zeolite gel.

The products are washed, for example with water at a suitable quantity, for example at about twice the volume of the homogeneous aqueous mixture. The wash can be at a temperature of from about 20-80° C. at atmospheric, vacuum or under pressure. The wash can continue until the pH of the filtrate approaches about 7-9. The solids are recovered by filtration, for instance, using known techniques such as centrifugation, gravity, vacuum filtration, filter press, or rotary drums, and dried, for example at a temperature of up to about 110 or 150° C.

The conditions for calcination to produce zeolites herein can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

ODSO

Example embodiments of the present disclosure include the use of one or more ODSO compounds as additional components in a homogeneous aqueous mixture for zeolite synthesis. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In the process herein, an effective amount of one or more ODSO compounds are used in the synthesis of low silica zeolite having MFI framework. In certain embodiments an effective amount can be based on an amount that attains a desired pH range. In certain embodiments an effective amount can be approximately equivalent to a reduction in the amount of water that is used in the homogeneous aqueous mixture compared to synthesis without ODSO. In certain embodiments an effective amount can be based on a ratio of ODSO to alkali metal. In certain embodiments a ratio of ODSO to alkali metal represents the amount of ODSO relative to the amount of the selected alkali metal on a mass/mass basis or a molar/molar basis. For example, if sodium is used the ratio is expressed as ODSO/Na on a mass/mass basis or a molar/molar basis. In certain embodiments, the effective amount of ODSO is that which results in a pH level of greater than or equal to about 9, 10 or 11, for example in the range of about 9-14, 9-13, 10-14, 11-14 or 11-13 in the homogeneous aqueous mixture. In certain embodiments, the effective amount of ODSO can be relative to the quantity of basic groups in the in the homogeneous aqueous mixture, such as OH—, to attain a desired pH range, with basic group contributions from the alkali metal source or in certain embodiments from the alkali metal source and from an optional structure directing agent containing basic groups; such a ratio can be expressed on a molar basis or on a mass basis. In certain embodiments, the effective amount of ODSO is that which results in a product that is at least about 0.1 mass % of low silica zeolite having MFI framework. In certain embodiments in which the ratios of materials in the homogeneous aqueous mixture are suitable for production of analcime in the absence of ODSO, the effective amount of ODSO is greater than that which produces 100 mass % analcime (ANA) zeolite. In certain embodiments, analcime zeolite is produced as a co-product, and the effective amount of ODSO is greater than that which produces 100 mass % analcime zeolite and is less than that which produces 100 mass % amorphous silica.

In certain embodiments, the ODSO compounds used as a component herein for zeolite synthesis are obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are the same or different C1-C10 alkyl or C6-C10 aryl. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and a component used herein for zeolite synthesis comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments a component used herein for zeolite synthesis comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), R'—SO—SOO—OR) and (R'—SOO—SOO—OR). In certain embodiments a component used herein for zeolite synthesis comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (r'—SOO—SO—OR), (R'—SO—SOO—OR) and (R'—SOO—SOO—OR). In certain embodiments a component used herein for zeolite synthesis comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are the same or different C1-C10 alkyl or C6-C10 aryl. In certain embodiments, the R and R' are methyl and/or ethyl groups. In certain embodiments, the ODSO compound(s) used herein as a component for zeolite synthesis have 1 to 20 carbon atoms.

In certain embodiments, a component used herein for zeolite synthesis comprises, consists of or consists essentially of ODSO compounds having an average density greater than about 1.0 g/cc. In certain embodiments, a component used herein for zeolite synthesis comprises, consists of or consists essentially of ODSO compounds having an average boiling point greater than about 80° C. In certain embodiments, a component used herein for zeolite synthesis comprises, consists of or consists essentially of ODSO compounds having a dielectric constant that is less than or equal to 100 at 0° C.

Table 2 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as a component for zeolite synthesis comprise all or a portion of the ODSO compounds contained in an oxidation effluent stream that is obtained by controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as a component for zeolite synthesis are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2}RSSR + \tfrac{1}{2}H_2O \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2R'SH + 2RSH + O_2 \rightarrow 2R'SSR + 2H_2O \qquad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and their combination. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below examples and data are exemplary. It is to be understood that other ratios and types of aluminum sources, silica sources, bases and structure directing agents can be used as compared to the examples.

Figures 3A, 3B:
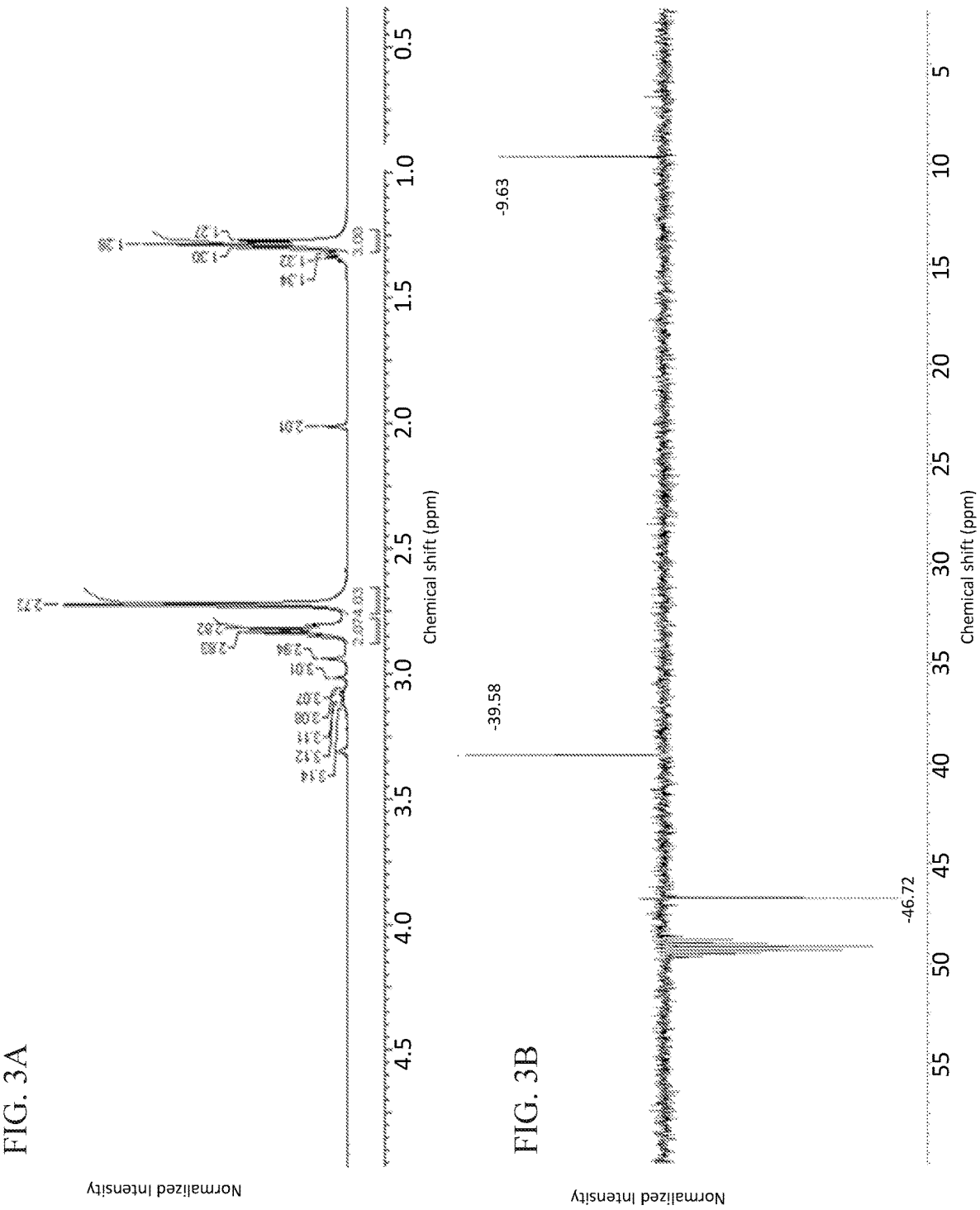
FIG. 3A is the experimental $^1$H-NMR spectrum of the polar, water-soluble ODSO fraction used in examples herein.
FIG. 3B is the experimental $^{13}$C-DEPT-135-NMR spectrum of the polar, water-soluble ODSO fraction used in examples herein.

Reference Example: The ODSO mixture used in the examples below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.9. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form the ODSO composition used in the present examples.

Example 1: Precursors were used with a sol-gel SAR of about 25 in a comparative example without ODSO. Aluminum nitrate nonahydrate (0.2683 g) was weighed into a polytetrafluoroethylene (PTFE) liner (45 ml). Thereafter, 0.7511 g of a 50 wt. % sodium hydroxide solution and 7.0193 g of a 20 wt. % tetrapropylammonium hydroxide (TPAOH) solution were added and the mixture stirred. Next, distilled water (5.6160 g) was added and the mixture was kept under stirring. The silica source, (1.3051 g, 40 wt. %), was added and the mixture stirred until homogeneous. The pH of the sol-gel before heating was about 14, and the pH of the mother liquor after crystallization was about 14. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.155 g. X-ray diffraction shows the product to be analcime (ANA). The as-made sample from Example 1 was calcined at 550° C. for 8 hours (2° C./min ramp rate to 150° C., hold for 5 hours, 1.5° C./min ramp rate to 550° C.) to render the product porous.

Example 2: ODSO as described in the Reference Example was added to the sol-gel used to synthesize zeolite, at an ODSO/Na ratio of about 1.6. As in the comparative Example 1, precursors were used with a sol-gel SAR of about 25. Aluminum nitrate nonahydrate (0.2667 g) was weighed into a PTFE liner (45 ml). Thereafter, 0.7497 g of a 50 wt. % sodium hydroxide solution and 7.0281 g of a 20 wt. % TPAOH solution were added and the mixture stirred. Next, distilled water (5.2792 g) and ODSO (0.3365 g) were added and the mixture was kept under stirring. The silica source, (1.3004 g, 40 wt. %), was added and the mixture stirred until homogeneous. The pH of the sol-gel before heating was about 14, and the pH of the mother liquor after crystallization was about 14. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.1216 g. X-ray diffraction shows the product to be analcime (ANA). The as-made sample from Example 2 was calcined at 550° C. for 8 hours (2° C./min ramp rate to 150° C., hold for 5 hours, 1.5° C./min ramp rate to 550° C.) to render the product porous.

Example 3: ODSO as described in the Reference Example was added to the sol-gel used to synthesize zeolite, at an ODSO/Na ratio of about 3.1. As in the comparative Example 1, precursors were used with a sol-gel SAR of about 25. Aluminum nitrate nonahydrate (0.2652 g) was weighed into a PTFE liner (45 ml). Thereafter, 0.7438 g of a 50 wt. % sodium hydroxide solution and 7.0223 g of a 20 wt. % TPAOH solution were added and the mixture stirred. Next, distilled water (4.9422 g) and ODSO (0.6731 g) were added and the mixture was kept under stirring. The silica source, (1.3037 g, 40 wt. %), was added and the mixture stirred until homogeneous. The pH of the sol-gel before heating was about 14, and the pH of the mother liquor after crystallization was about 14. The PTFE liner was positioned within an autoclave and transferred to an oven and heated to a temperature of 175° C. whilst rotating the autoclave. The autoclave was maintained at isothermal conditions for 36 hours. The product was filtered and washed with distilled water before drying at 110° C. The dry mass was 0.2952 g. X-ray diffraction shows the product to be a mixture of analcime (ANA) and ZSM-5 (MFI). The as-made sample from Example 3 was calcined at 550° C. for 8 hours (2° C./min ramp rate to 150° C., hold for 5 hours, 1.5° C./min ramp rate to 550° C.) to render the product porous.

Example 4: ODSO as described in the Reference Example was added to the sol-gel used to synthesize zeolite, at an ODSO/Na ratio of about 6.3. As in the comparative Example 1, precursors were used with a sol-gel SAR of about 25. Aluminum nitrate nonahydrate (0.2642 g) was weighed into a PTFE liner (45 ml). Thereafter, 0.7451 g of a 50 wt. % sodium hydroxide solution and 7.0216 g of a 20 wt. % TPAOH solution were added and the mixture stirred. Next, distilled water (4.2680 g) and ODSO (1.3470 g) were added and the mixture was kept under stirring. The silica source, (1.3008 g, 40 wt. %), was added and the mixture stirred until homogeneous. The pH of the sol-gel before heating was about 14, and the pH of the mother liquor after crystallization was about 13. The PTFE liner was positioned within an autoclave and transferred to an oven and heated to a temperature of 175° C. whilst rotating the autoclave. The autoclave was maintained at isothermal conditions for 18 hours. The product was filtered and washed with distilled water before drying at 110° C. The dry mass was 0.4203 g. X-ray diffraction shows the product to be ZSM-5 (MFI). The as-made sample from Example 4 was calcined at 550° C. for 8 hours (2° C./min ramp rate to 150° C., hold for 5 hours, 1.5° C./min ramp rate to 550° C.) to render the product porous.

Example 5: ODSO as described in the Reference Example was added to the sol-gel used to synthesize zeolite, at an ODSO/Na ratio of about 7.6. As in the comparative Example 1, precursors were used with a sol-gel SAR of about 25. Aluminum nitrate nonahydrate (0.2656 g) was weighed into a PTFE liner (45 ml). Thereafter, 0.7437 g of a 50 wt. % sodium hydroxide solution and 7.0237 g of a 20 wt. % TPAOH solution were added and the mixture stirred. Next, distilled water (3.9874 g) and ODSO (1.6293 g) were added and the mixture was kept under stirring. The silica source, (1.3029 g, 40 wt. %), was added and the mixture stirred until homogeneous. The pH of the sol-gel before heating was about 12, and the pH of the mother liquor after crystallization was about 11. The PTFE liner was positioned within an autoclave and transferred to an oven and heated to a temperature of 175° C. whilst rotating the autoclave. The autoclave was maintained at isothermal conditions or 36 hours. The product was filtered and washed with distilled water before drying at 110° C. The dry mass was 0.5216 g. X-ray diffraction shows the product to be ZSM-5 (MFI). The as-made sample from Example 5 was calcined at 550° C. for 8 hours (2° C./min ramp rate to 150° C., hold for 5 hours, 1.5° C./min ramp rate to 550° C.) to render the product porous.

Example 6: ODSO as described in the Reference Example was added to the sol-gel used to synthesize zeolite, at an ODSO/Na ratio of about 8.8. As in the comparative Example 1, precursors were used with a sol-gel SAR of about 25. Aluminum nitrate nonahydrate (0.2663 g) was weighed into a PTFE liner (45 ml). Thereafter, 0.7475 g of a 50 wt. % sodium hydroxide solution and 7.0212 g of a 20 wt. % TPAOH solution were added and the mixture stirred. Next, distilled water (3.7292 g) and ODSO (1.8874 g) were added and the mixture was kept under stirring. The silica source, (1.3055 g, 40 wt. %), was added and the mixture stirred until homogeneous. The pH of the sol-gel before heating was about 6.5, and the pH of the mother liquor after crystallization was about 3.5. The PTFE liner was positioned within an autoclave and transferred to an oven and heated to a temperature of 175° C. whilst rotating the autoclave. The autoclave was maintained at isothermal conditions or 18 hours. The product was filtered and washed with distilled water before drying at 110° C. The dry mass was 0.4531 g. X-ray diffraction shows the product to be amorphous silica. The as-made sample from Example 6 was calcined at 550° C. for 8 hours (2° C./min ramp rate to 150° C., hold for 5 hours, 1.5° C./min ramp rate to 550° C.) to render the product porous.

Figure 4:
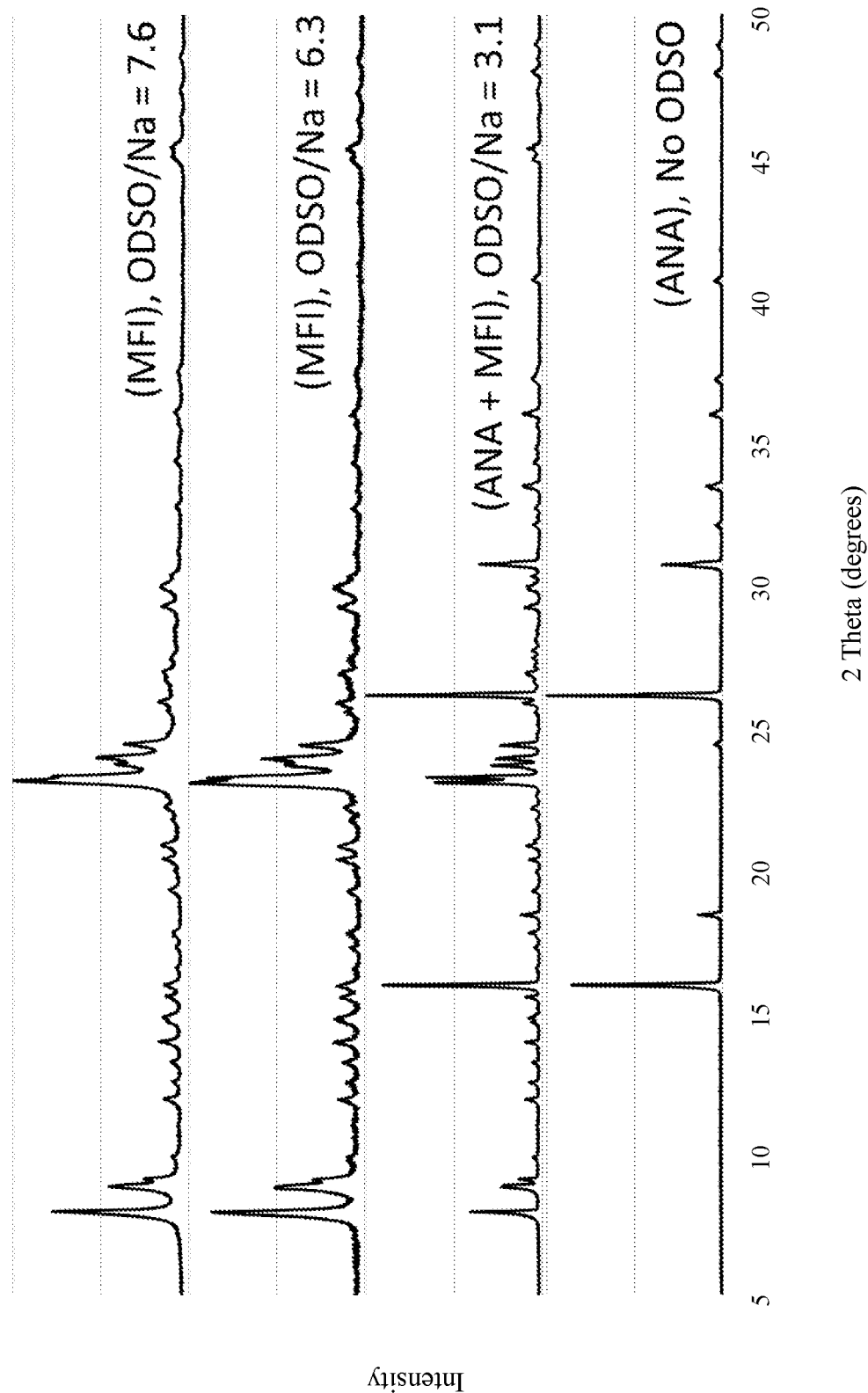
FIG. 4 shows X-ray diffraction patterns of the as-made products (prior to calcination) from examples herein.
Figure 5:
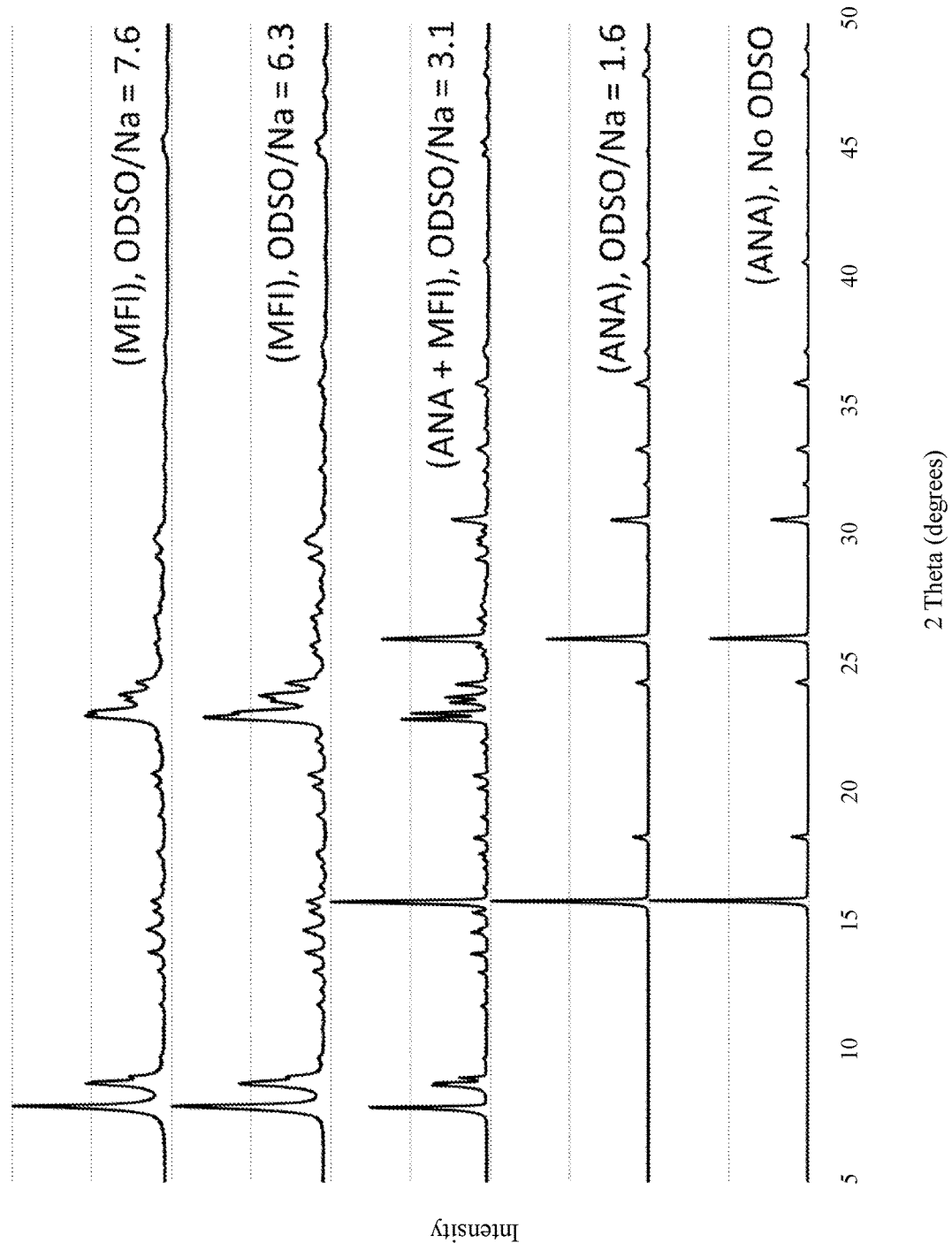
FIG. 5 shows X-ray diffraction patterns of the calcined products from the examples herein.

FIG. 4 shows the X-ray diffraction patterns of the as-made products (prior to calcination) from the above Examples 1, 3, 4 and 5, where each pattern is offset on the y-axis by an equivalent amount for clarity, and where the X-ray diffraction patterns are normalized to the highest intensity peak, which are effective ways to compare patterns relative to one another. FIG. 5 shows the X-ray diffraction patterns of the calcined products from the above Examples 1-5, where each pattern is offset on the y-axis by an equivalent amount for clarity, and where the X-ray diffraction patterns are normalized to the highest intensity peak.

Table 3 identifies the structure of the product as a function of the ODSO content. Under approximately equivalent ratios of precursors/reagents, and under approximately equivalent synthesis process conditions, in the absence of ODSO or with very low ODSO/Na ratios (for instance where the ODSO/Na ratio is about 1.6), analcime is produced. For instance, in the examples provided herein using the selected materials and ratios of silica, alumina, alkali metal and structure directing agent, and under the recited conditions, zeolite having MFI framework is produced when an ODSO/Na ratio value is about 3.1, 6.3 or 7.6. At certain ODSO/Na ratios, co-crystallized MFI zeolite and zeolite mordenite; for example, under approximately equivalent ratios of precursors/reagents, and under approximately equivalent synthesis process conditions, co-crystallized MFI zeolite and zeolite mordenite is produced when an ODSO/Na ratio is about 4.7 or 5.8 (as disclosed in commonly owned U.S. application Ser. No. 17/719,926 filed Apr. 13, 2022, entitled "Method For Manufacture Of Co-Crystallized Pentasil Zeolite And Zeolite Mordenite In The Presence Of ODSO" which is incorporated by reference herein in its entirety. In certain embodiments of the present process for producing low silica zeolite having MFI framework in a sol-gel that is effective to produce analcime, an effective amount of ODSO is greater than an amount of ODSO that produces 100% analcime and is less than an amount of ODSO that produces 100% amorphous silica-alumina or amorphous silica. In certain embodiments of the present process for producing low silica zeolite having MFI framework, an effective ODSO/Na mass ratio can be in the range of about 1.7-8.7, 2.5-8.7, 3-8.7, 3.1-8.7, 1.7-8.2, 2.5-8.2, 3-8.2, 3.1-8.2, 1.7-7.6, 2.5-7.6, 3-7.6 or 3.1-7.6. In certain embodiments the low silica zeolite having MFI framework is ZSM-5. In certain embodiments, the effective amount of ODSO is expressed as ODSO/Na mass ratio ranges, which is calculated from a baseline compositional ratio of 25 $SiO_2$:1 $Al_2O_3$:13.4 $Na_2O$:20 TPA:2000 $H_2O$ on a molar basis. In the example, approximately equivalent conditions and ratios were used, except that an approximately equivalent mass of water was replaced with ODSO and hence the ODSO-enhanced compositional ratio is approximately equivalent to the baseline compositional ratio for the Comparative Example.

It is also noted that the amount of sodium would be adjusted based on the anions in other sol-gel components. For instance, in the examples herein a portion of the sodium cations in the quantity of $Na_2O$ counterbalances nitrate anions that form the aluminum source (aluminum nitrate nonahydrate), for instance, 3 of the 13.4 moles of $Na_2O$ that are present in the compositional ratio counter the anions; with an aluminum source that does not include such anions or contains less anions, the required amount of sodium cations is reduced (for instance, if no anions are present in the aluminum source, an equivalent compositional ratio would include 10.4 moles of $Na_2O$).

There is a clear transition from ANA through to a mixture of ANA and MFI, and then to pure MFI, within increasing ratio of ODSO to Na. In the absence of ODSO, that is the water-only synthesis of Example 1, analcime is produced when the SAR of the sol-gel is 25. This contrasts with the comparative example in the '206 application where higher silica ZSM-5 zeolite, for example a SAR of 100, yielded ZSM-5 in the absence of ODSO.

Figure 6:
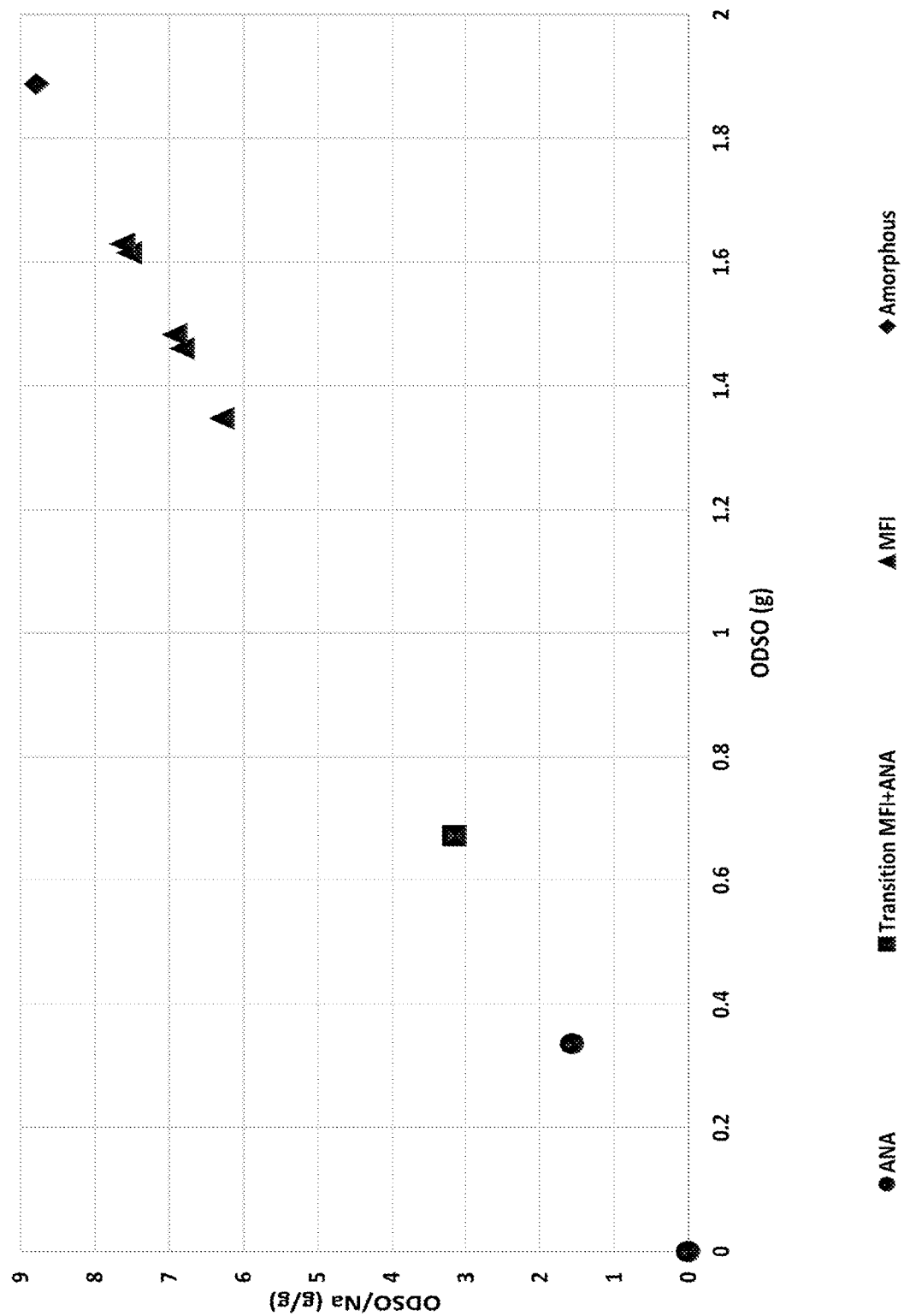
FIG. 6 is a plot of product phases of examples herein as a function of the ODSO content and the ODSO to sodium ratio.

FIG. 6 is a plot of product phases. The transition between ANA and MFI phases, and eventually to an amorphous phase, is shown as a function of the ODSO amount and ODSO to sodium mass ratio. Under the ratios of precursors used, the MFI phase is predominant at ODSO/Na mass ratios between about 6 and 8. At an ODSO/Na mass ratio of about 3, the MFI phase is present along with the ANA phase.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| Idealized cell data a, b and c parameters (Å) | Crystal chemical data* a, b and c parameters (Å) | Number of T atoms in unit cell | Composite building units | Framework density | Member ring size | Channel size [100] (Å) | Channel size [010] (Å) |
|---|---|---|---|---|---|---|---|
| 20.1, 19.7, 13.1 | 20.07, 19.92, 13.42 | 96 | mor, cas, mel, mfi | 17.9 T/ 1000 Å$^3$ | 10 | 5.1 × 5.5 | 5.3 × 5.6 |

*Data obtained from: Olson, David H., George T. Kokotailo, Stephen L. Lawton and Walter M. Meier. "Crystal structure and structure-related properties of ZSM-5." *Journal of Physical Chemistry* 85 (1981): 85, 2238-2243.

TABLE 2

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | $H_3C-\underset{\underset{O}{\|}}{\overset{\overset{O}{\|}}{S}}-S\overset{\diagup\!\!\diagup O}{\diagdown CH_3}$ <br> 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | $H_3C-\underset{\underset{O}{\|}}{\overset{\overset{O}{\|}}{S}}-\underset{\underset{O}{\|}}{\overset{\overset{O}{\|}}{S}}-CH_3$ <br> 1,2-Dimethyldisulfane 1,1,2,2-tetraoxide |
| Alkyl-sulfoxidesulfonate | (R—SO—SOO—OH) | $H_3C-\underset{\underset{O}{\|}}{\overset{}{S}}-\underset{\underset{O}{\|}}{\overset{\overset{O}{\|}}{S}}-OH$ <br> Methylsulfanesulfonic acid oxide |

TABLE 2-continued

| ODSO Name | Formula | Structure Examples |
|---|---|---|
| Alkyl-sulfonesulfonate | (R—SOO—SOO—OH) | $$H_3C-\overset{\overset{O}{\|}}{\underset{\underset{O}{\|}}{S}}-\overset{\overset{O}{\|}}{\underset{\underset{O}{\|}}{S}}-OH$$ 1-Hydroxy-2-methyldisulfane 1,1,2,2-tetraoxide |
| Alkyl-sulfoxidesulfinate | (R—SO—SO—OH) | $$H_3C-\overset{\overset{O}{\|}}{S}-\overset{\overset{O}{\|}}{S}-OH$$ 1-Hydroxy-2-methyldisulfane 1,2-dioxide |
| Alkyl-sulfonesulfinate | (R—SOO—SO—OH) | $$H_3C-\overset{\overset{O}{\|}}{\underset{\underset{O}{\|}}{S}}-\overset{\overset{O}{\|}}{S}-OH$$ Methylsulfanesulfinic acid dioxide |

R and R' can be the same or different the same or different C1-C10 alkyl or C6-C10 aryl.

TABLE 3

| ODSO/ Na Ratio (w/w) | Water Substitution (w %)* | Product Structure | Normalized Yield |
|---|---|---|---|
| 0 | 0 | ANA zeolite | 1.00 |
| 1.56 | 6 | | 0.78 |
| 3.15** | 12 | MFI/ANA zeolite | 1.90 |
| 4.74 | 18 | MFI/MOR zeolite | 1.96 |
| 4.72** | 18 | | 2.81 |
| 5.76** | 22 | | 3.18 |
| 6.29 | 24 | MFI zeolite | 2.71 |
| 6.82** | 26 | | 3.25 |
| 6.92 | 26 | | 3.19 |
| 7.53 | 29 | | 3.25 |
| 7.62** | 29 | | 3.37 |
| 8.22 | 31 | amorphous plus some MFI zeolite*** | 3.29 |
| 8.16** | 31 | amorphous | 2.79 |
| 8.79 | 34 | | 2.92 |
| 9.37 | 36 | amorphous plus | 3.27 |
| 12.56 | 48 | unknown crystalline phase | 2.01 |
| 15.76 | 60 | | 2.72 |

*Note that the water substitution refers to the replacement of the utility water that is added to form the homogeneous aqueous mixture, and excludes water added from certain precursors/reagents.
**The denoted examples were carried out with a crystallization time of 36 hours; all others are carried out with a crystallization time of 18 hours.
***Small amounts of MFI zeolite were present.

What is claimed is:

1. A method for the preparation of zeolite having a MFI framework and a $SiO_2/Al_2O_3$ molar ratio (SAR) in the range of less than about 40, the method comprising:
   forming a homogeneous aqueous mixture of a silica source, an aluminum source, an alkali metal source, an optional structure directing agent, and an effective amount of water-soluble oxidized disulfide oil (ODSO); and
   heating the homogeneous aqueous mixture under conditions and for a time effective to form a crystalline zeolite as precipitate suspended in a supernatant, wherein the precipitate comprises MFI framework zeolite with a SAR of less than about 40.

2. The method of claim 1, wherein the precipitate is recovered and calcined at a suitable temperature, temperature ramp rate and for a suitable period of time to realize porous MFI framework zeolite.

3. The method of claim 1, wherein
   a cumulative amount of ODSO and water is equivalent to an amount of water that is effective to produce analcime (ANA) zeolite in the absence of ODSO;
   the cumulative amount of ODSO and water, an amount of the silica source, an amount of the aluminum source, an amount of the alkali metal source, and an amount of the optional structure directing agent are provided at an ODSO-enhanced compositional ratio;
   the ODSO-enhanced compositional ratio is equivalent to a baseline compositional ratio of water, silica source, aluminum source, alkali metal source and optional structure directing agent, the baseline compositional ratio being effective to produce analcime zeolite in the absence of ODSO; and
   the conditions and time of heating are equivalent to those that are effective to produce analcime zeolite in the absence of ODSO.

4. The method as in claim 3, wherein the effective amount of ODSO is greater than an amount of ODSO that produces only analcime zeolite, and less than an amount of ODSO that produces only amorphous silica.

5. The method as in claim 3, wherein the alkali metal source is sodium and the mass ratio of ODSO to sodium is in the range of about 1.7-8.7.

6. The method as in claim 1, wherein the ODSO is derived from oxidation of disulfide oil compounds present in an effluent refinery hydrocarbon stream recovered following catalytic oxidation of mercaptans present in a mercaptan-containing hydrocarbon stream.

7. The method as in claim 1, wherein the one or more ODSO compounds are water-soluble ODSO compounds having 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

8. The method as in claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

9. The method as in claim 1, wherein the one or more ODSO compounds are water-soluble ODSO compounds having 3 or more oxygen atoms and include a mixture of two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

10. The method as in claim 1, wherein the zeolite product has a silica-to-alumina ratio in the range of about 10-25.

11. The method as in claim 1, wherein the aluminum source is selected from the group consisting of aluminates, alumina, other zeolites, aluminum colloids, boehmites, pseudo-boehmites, aluminum hydroxides, aluminum salts, aluminum alkoxides, aluminum wire and alumina gels.

12. The method as in claim 1, wherein the silica source is selected from the group consisting of sodium silicate (water glass), rice husk, fumed silica, precipitated silica, colloidal silica, silica gels, zeolites, dealuminated zeolites, silicon hydroxides and silicon alkoxides.

13. The method as in claim 1, wherein the structure directing agent is used to stabilize the zeolite structure.

14. The method as in claim 13, wherein the structure directing agent is selected from the group consisting of quaternary ammonium ions, trialkylamines, dialkylamines, monoalkylamines, cyclic amines, alkylethanol amines, cyclic diamines, alkyl diamines, alkyl polyamines, alcohols, ketones, morpholine, and glycerol.

15. The method as in claim 13, wherein the structure directing agent comprises a cation selected from the group consisting of tetramethylammonium, tetraethylammonium, tetrapropylammonium, tetrabutylammonium, and cetyltrimethylammonium, paired with an anion selected from the group consisting of hydroxide, bromide and iodide.

16. The method as in claim 13, wherein the structure directing agent is selected from the group consisting of: bifunctional dicationic molecules containing a long aliphatic chain, dual-porogenic surfactants, silylated polyethylenimine polymers, amphiphilic organosilanes, hydrophilic cationic polyelectroyltes and hydrophilic cationic polymers.

17. The method as in claim 1, wherein crystallization occurs in the absence of a seed.

18. The method as in claim 1, wherein crystallization occurs in the presence of a seed selected from the group consisting of ZSM-5 (MFI), ZSM-8 (MFI), ZSM-11 (MEL) and Silicalite-1 (MFI).

19. The method as in claim 1, wherein the pH of the homogeneous aqueous mixture is in the range from about 9-14.

20. The method as in claim 1, wherein the homogeneous aqueous mixture is formed by:
(a) providing the silica source; and
combining with the silica source the aluminum oxide source, the alkali metal source, the optional structure directing agent and the water-soluble ODSO;
wherein the water-soluble ODSO is added after the aluminum oxide source, the alkali metal source, and the structure directing agent, or wherein the water-soluble ODSO is first combined with the aluminum oxide source, the alkali metal source and the structure directing agent, and then combined with the silica source; and
(b) providing the aluminum oxide source, the alkali metal source and the optional structure directing agent as a first mixture; and
combining the first mixture with the silica source and the water-soluble ODSO;
wherein the water-soluble ODSO is added after the silica source; or wherein the water-soluble ODSO is first combined with the silica source, and then combined with the first mixture; and
wherein an effective amount of water for the homogeneous aqueous mixture is provided by using a water-containing silica source, and/or by using an aqueous mixture of the aluminum oxide source, the alkali metal source and the optional structure directing agent
(c) combining the water-soluble ODSO with the silica source to form a first mixture; and
combining the first mixture with the aluminum oxide source, alkali metal source and the structure directing agent;
wherein an effective amount of water for the homogeneous aqueous mixture is provided by using a water-containing silica source, and/or by using an aqueous mixture of the aluminum oxide source, the alkali metal source and the optional structure directing agent;
or
(d) combining the water-soluble ODSO with the aluminum oxide source, the alkali metal source and the optional structure directing agent to form a first mixture; and
combining the first mixture with the silica source;
wherein an effective amount of water for the homogeneous aqueous mixture in (a)-(d) is provided by using utility water, a water-containing silica source, and/or by using an aqueous mixture of the aluminum oxide source, the alkali metal source and the optional structure directing agent.

* * * * *